United States Patent
Yamamoto et al.

(10) Patent No.: US 9,365,746 B2
(45) Date of Patent: Jun. 14, 2016

(54) SILICONE COMPOSITION, RELEASE PAPER OR FILM, AND MAKING METHOD

(75) Inventors: Kenji Yamamoto, Annaka (JP); Shunji Aoki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 488 days.

(21) Appl. No.: 13/102,193

(22) Filed: May 6, 2011

(65) Prior Publication Data

US 2011/0274935 A1 Nov. 10, 2011

(30) Foreign Application Priority Data

May 7, 2010 (JP) ................................. 2010-107206

(51) Int. Cl.
| | | |
|---|---|---|
| C09D 183/04 | (2006.01) |
| C09J 7/02 | (2006.01) |
| C08G 77/12 | (2006.01) |
| C08G 77/20 | (2006.01) |

(52) U.S. Cl.
CPC ............. C09J 7/0228 (2013.01); C09D 183/04 (2013.01); *C08G 77/12* (2013.01); *C08G 77/20* (2013.01); *C09J 2400/283* (2013.01); *C09J 2483/005* (2013.01); *Y10T 428/31663* (2015.04)

(58) Field of Classification Search
None
See application file for complete search history.

(56) References Cited

U.S. PATENT DOCUMENTS

| | | | |
|---|---|---|---|
| 4,609,574 A | 9/1986 | Keryk et al. |
| 4,772,515 A | 9/1988 | Hara et al. |
| 5,708,046 A * | 1/1998 | Jones et al. ................... 522/99 |
| 5,932,060 A | 8/1999 | O'Brien et al. |
| 5,942,591 A | 8/1999 | Itoh et al. |
| 6,277,941 B1 | 8/2001 | Irifune et al. |
| 2004/0053059 A1* | 3/2004 | Mistele .................. 428/447 |
| 2006/0058486 A1* | 3/2006 | Lautenschlager ............... 528/31 |
| 2006/0128921 A1* | 6/2006 | Cray et al. ..................... 528/31 |
| 2011/0143025 A1* | 6/2011 | Morita et al. ................ 427/162 |

FOREIGN PATENT DOCUMENTS

| | | | |
|---|---|---|---|
| EP | 0 764 703 A2 | 3/1997 | |
| JP | 62-86061 A | 4/1987 | |
| JP | 63-251465 A | 10/1988 | |
| JP | 3-19267 B2 | 3/1991 | |
| JP | 7-97520 A | 4/1995 | |
| JP | 9-78032 A | 3/1997 | |
| JP | 10-316945 A | 12/1998 | |
| JP | 10316945 A * | 12/1998 | ................. C09J 7/02 |
| JP | 11-193366 A | 7/1999 | |
| JP | 2000-169794 A | 6/2000 | |
| JP | 2000-177058 A | 6/2000 | |

OTHER PUBLICATIONS

English machine translation of JP Patent 10316945 (IPDL) (JPO) (1998).*
Extended European Search Report issued Sep. 20, 2011, in European Patent Application No. 11165202.0.
Chinese Office Action dated May 8, 2014 for Chinese Application No. 201110198655.0 with English translation.

* cited by examiner

*Primary Examiner* — Kenneth Stachel
(74) *Attorney, Agent, or Firm* — Birch, Stewart, Kolasch & Birch, LLP

(57) ABSTRACT

An addition curing silicone composition comprising (A) an organopolysiloxane containing at least two alkenyl groups, (B) an adhesion promoter, (C) an organohydrogenpolysiloxane, and (D) a platinum catalyst is suited for use in release paper or film. The adhesion promoter is a compound which contains per molecule at least one substituent group having a functional group capable of radical reaction upon exposure to heat and/or UV, and at least one substituent group having a group capable of reaction with alkenyl and/or SiH group.

8 Claims, No Drawings

SILICONE COMPOSITION, RELEASE PAPER OR FILM, AND MAKING METHOD

CROSS-REFERENCE TO RELATED APPLICATION

This non-provisional application claims priority under 35 U.S.C. §119(a) on Patent Application No. 2010-107206 filed in Japan on May 7, 2010, the entire contents of which are to hereby incorporated by reference.

TECHNICAL FIELD

This invention relates to a silicone composition for release paper or film having improved adhesion to paper or plastic film substrates, a release paper or film having a cured coating of the composition, and a method for preparing the release paper or film.

BACKGROUND ART

It is well known from the past that release liners having release properties relative to sticky materials, typically pressure-sensitive adhesives are prepared by forming a cured coating having release properties on the surface of substrates such as paper, laminated paper and plastic film. Among the materials used for forming a cured coating having release properties are silicone compositions. For example, JP-A S62-86061 discloses a silicone composition comprising an alkenyl-containing organopolysiloxane, an organohydrogenpolysiloxane, and a platinum base compound.

Silicone compositions of this type are still predominant at the present because of their cure behavior and pot life. However, a problem has been pointed out that the adhesion between the cured coating and the substrate is not regarded sufficient. This poses limitation on the type of substrate that can be coated and necessitates pretreatment of the substrate.

Under the recent trend of available substrates, the use of plastic film substrates is increasing because of uniform and stable quality, high smoothness, and film thinness. As a wide variety of substrates are now available in the market, the requirement to improve the adhesion of silicone compositions to substrates becomes more desirable than ever.

Proposals for improving adhesion have also been made from the side of silicone compositions. For example, one attempt to use more adhesive materials includes blending of organic resins and addition of silane coupling agents. However, this attempt is utilized only under limited conditions because release properties are otherwise degraded. Another method is to modify the base polymer structure of the silicone composition. Base polymers having a branched structure containing $RSiO_{3/2}$ units are disclosed in JP-A S63-251465, JP-B H03-19267, JP-A H09-78032, and JP-A H11-193366. This method is mainly intended for light release upon high-speed peeling and for effective cure while some improvement in adhesion is achieved as a secondary effect. Also JP-A 2000-169794 and JP-A 2000-177058 propose the combined use of a solvent type silicone composition and a solventless silicone composition, thereby achieving the effect of reducing peeling speed dependence without modifying the base polymer structure. With respect to adhesion, this proposal does not surpass the existing solvent type silicone compositions.

As discussed above, there is available in the art no appropriate technique capable of improving the adhesion of a silicone composition without affecting the release properties thereof.

CITATION LIST

Patent Document 1: JP-A S62-86061
Patent Document 2: JP-A S63-251465
Patent Document 3: JP-B H03-19267
Patent Document 4: JP-A H09-78032
Patent Document 5: JP-A H11-193366
Patent Document 6: JP-A 2000-169794
Patent Document 7: JP-A 2000-177058

SUMMARY OF INVENTION

An object of the invention is to provide a silicone composition which can be coated onto a surface of a substrate such as paper or plastic film to form a non-tacky coating tenaciously adherent to the substrate surface. Another object is to provide a release paper or release film having a cured coating of the composition formed on a substrate, and a method for preparing the release paper or film.

The inventors have found that when a specific adhesion promoter is added to a conventional release paper or film-forming silicone composition, a cured coating which is tenaciously adherent to a substrate can be formed from the composition. The adhesion promoter is a compound which contains per molecule at least one substituent group having a functional group capable of radical reaction upon exposure to heat and/or UV, and at least one substituent group having a group capable of reaction with alkenyl and/or SiH group, is free of inhibitors S and P against platinum addition reaction, and is dissolvable or dispersible in the composition in a stable manner. As opposed to the prior art techniques of improving adhesion at more or less sacrifice of release properties, the addition of the adhesion promoter can improve adhesion without substantial impact on release properties.

The present invention provides a release paper or film-forming silicone composition, a release paper or film, and a method for preparing the release paper or film, as defined below.

In one aspect, the invention provides an addition curing silicone composition for release paper or film, comprising (A) 100 parts by weight of an organopolysiloxane containing at least two alkenyl groups in a molecule and having a viscosity of at least 0.04 Pa-s at 25° C., (B) 0.1 to 10 parts by weight of an adhesion promoter which is (B1) an organopolysiloxane containing at least two silicon-bonded alkenyl-containing substituent groups in a molecule, having an alkenyl content of 0.3 to 2.0 mol/100 g, and having a structure that two siloxane units in which the alkenyl-containing substituent group is bonded to silicon atom are linked directly or via up to 3 intervening siloxane units in which said substituent group is not bonded to silicon atom, the organopolysiloxane having a viscosity of less than 0.04 Pa-s at 25° C., and/or (B2) a compound containing in a molecule at least one substituent group of 2 to 10 carbon atoms having a carbon-carbon unsaturated bond (double or triple bond) as functionality, and at least one substituent group having a group capable of addition reaction and/or condensation reaction with the alkenyl group in component (A) and/or a silicon-bonded hydrogen atom in component (C), (C) 0.1 to 20 parts by weight of an organohydrogenpolysiloxane containing at least three silicon-bonded hydrogen atoms in a molecule, (D) a catalytic amount of a platinum group metal base catalyst, and (E) an amount of an optional organic solvent.

In a preferred embodiment, component (B1) is an organopolysiloxane represented by the compositional formula (1) having a structure of the general formula (2), and having an average degree of polymerization of 2 to 50.

$$[M]_{m1}[M^A]_{m2}[D]_{d1}[D^A]_{d2}[T]_{t1}[T^A]_{t2}[Q]_{q1} \quad (1)$$

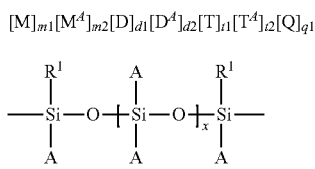

(2)

Herein $R^1$ is an alkenyl-containing substituent group of 2 to 10 carbon atoms, A is $R^2$ or a siloxane residue bonded via an oxygen atom and selected so as to meet formula (1), two A groups connected to one silicon atom may form a cyclic structure as $-O(SiR^2{}_2O)_y-$, $R^2$ is a substituted or unsubstituted monovalent hydrocarbon group of 1 to 10 carbon atoms, x is an integer of 0 to 3, y is an integer selected such that the organopolysiloxane of formula (1) may have an average degree of polymerization of 2 to 50, M, $M^A$, D, $D^A$, T, $T^A$, and Q are siloxane units as defined below, $O_{1/2}$ denoting that adjacent siloxane units are linked via an oxygen atom, M and $M^A$ each are:

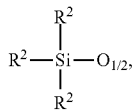

with the proviso that at least one $R^2$ in $M^A$ is $R^1$,
D and $D^A$ each are:

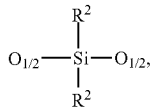

with the proviso that at least one $R^2$ in $D^A$ is $R^1$,
T and $T^A$ each are:

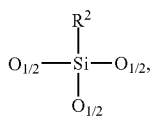

with the proviso that $R^2$ in $T^A$ is $R^1$,
Q is:

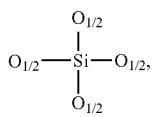

m1, m2, d1, d2, t1, t2, and q1 are numbers satisfying the equations:

$$t1+t2+2\times q1 \le m1+m2 \le 2+t1+t2+2\times q1$$

$$0 \le d1+d2 \le 48,\ 0 \le t1+t2 \le 30,\ 0 \le q1 \le 20,$$

$$0.25 \le (m2+d2+t2)/(m1+m2+d1+d2+t1+t2+q1) \le 1.$$

In a preferred embodiment, x in formula (2) is 0 or 1.
In a preferred embodiment, component (B1) is a compound of linear or branched siloxane structure having the general formula (3) or (4).

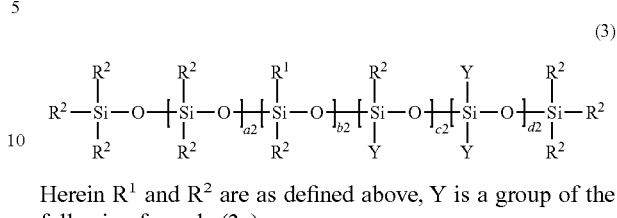

(3)

Herein $R^1$ and $R^2$ are as defined above, Y is a group of the following formula (3a):

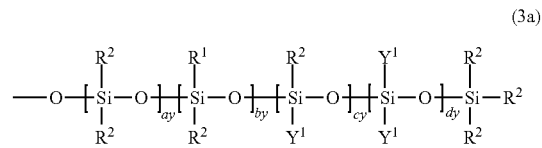

(3a)

wherein $R^1$ and $R^2$ are as defined above, $Y^1$ is a group of the following formula (3b):

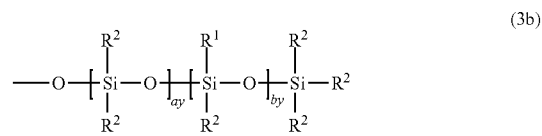

(3b)

wherein $R^1$ and $R^2$ are as defined above, a2, b2, ay, and by each are an integer of 0 to 48, c2 and cy each are an integer of 0 to 30, d2 and dy each are an integer of 0 to 20, formulae (3), (3a) and (3b) each denote a random structure and include at least one structure that two siloxane units in which the alkenyl-containing substituent group $R^1$ is bonded to silicon atom are linked directly or via up to 3 intervening siloxane units in which $R^1$ is not bonded to silicon atom.

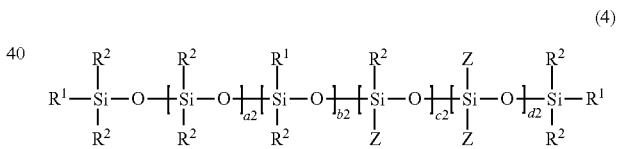

(4)

Herein $R^1$ and $R^2$ are as defined above, Z is a group of the following formula (4a):

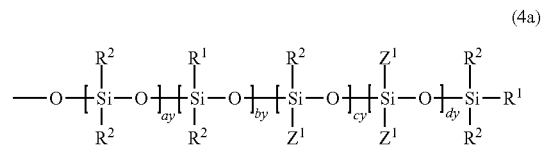

(4a)

wherein $R^1$ and $R^2$ are as defined above, $Z^1$ is a group of the following formula (4b):

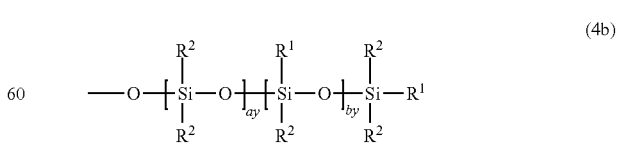

(4b)

wherein $R^1$ and $R^2$ are as defined above, a2, b2, ay, and by each are an integer of 0 to 48, c2 and cy each are an integer of 0 to 30, d2 and dy each are an integer of 0 to 20, formulae (4), (4a) and (4b) each denote a random structure and include at least one structure that two siloxane units in which the alkenyl-containing substituent group $R^1$ is bonded to silicon atom are linked directly or via up to 3 intervening siloxane units in which $R^1$ is not bonded to silicon atom.

In another preferred embodiment, component (B1) is a compound of cyclic siloxane structure having the general formula (5).

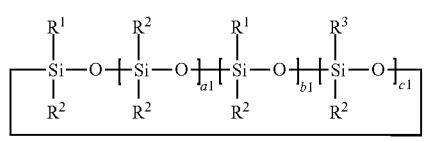

(5)

Herein $R^1$ and $R^2$ are as defined above, $R^3$ is a substituent group having an OH or SiH group as functionality or a substituted or unsubstituted monovalent hydrocarbon group of 1 to 10 carbon atoms free of aliphatic unsaturation, a1 is 0 or 1, b1 is an integer of 1 to 6, c1 is an integer of 0 to 5, and a1+b1+c1 is an integer of at least 2.

In a preferred embodiment, component (B2) is a compound containing a divalent structural unit having the general formula (6-1), a compound containing divalent structural units having the general formulae (6-2) and (6-3), a compound of cyclic structure having the general formula (7-1), or a compound of cyclic structure having the general formula (7-2).

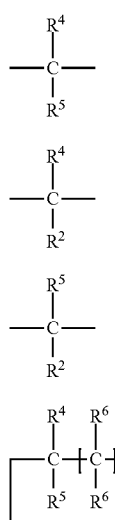

(6-1)
(6-2)
(6-3)
(7-1)

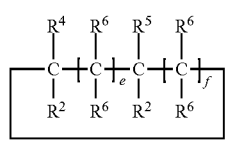

(7-2)

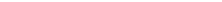

Herein $R^2$ is a substituted or unsubstituted monovalent hydrocarbon group of 1 to 10 carbon atoms, $R^4$ is a substituent group of 2 to 10 carbon atoms containing alkynyl, acryloyloxy or methacryloyloxy, $R^5$ is a substituent group having an OH, SiH or alkenyl group as functionality, $R^6$ is hydrogen, a saturated hydrocarbon group of 1 to 10 carbon atoms or aromatic group, the same group as $R^4$, or the same group as $R^5$, d is 4 to 10, and e+f is 3 to 9.

In another aspect, the invention provides a method for preparing a release paper or film, comprising the steps of coating the silicone composition defined above directly onto a paper or plastic film substrate, and applying heat and/or UV radiation to cure the coating. Typically the step of applying heat and/or UV radiation includes UV irradiation and subsequent heating to cure the coating.

In a further aspect, the invention provides a release paper or film comprising a cured coating of the silicone composition defined above.

ADVANTAGEOUS EFFECT OF INVENTION

According to the invention, by incorporating an adhesion promoter of specific structure into a conventional release paper or film-forming silicone composition, coating the composition onto a substrate, and applying heat and/or UV radiation to cure the composition, there is obtained a non-tacky cured coating which is tenaciously adherent to the substrate. As opposed to the prior art techniques of improving adhesion at more or less sacrifice of release properties, the invention can improve adhesion without substantial impact on release properties.

DESCRIPTION OF EMBODIMENTS

Component A

Component (A) is an organopolysiloxane containing at least two alkenyl groups in a molecule and having an absolute viscosity of at least 0.04 Pa-s at 25° C., as measured by a rotational viscometer. Specifically, the organopolysiloxane is of a structure having the general formula (8).

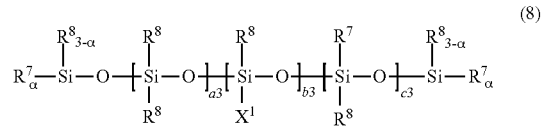

(8)

Herein $R^7$ is alkenyl, $R^8$ is a monovalent organic group free of aliphatic unsaturation or a hydroxyl group, $X^1$ is a group of formula (9):

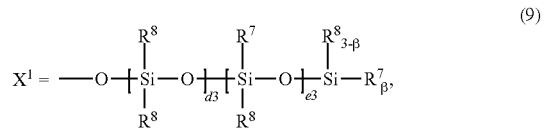

(9)

a3, b3, c3, d3, and e3 are such positive numbers that the organopolysiloxane may have a viscosity of at least 0.04 Pa-s at 25° C. and a viscosity in 30 wt % toluene solution of up to 70 Pa-s at 25° C., b3, c3, d3, and e3 may be 0, α and β each are 0 or an integer of 1 to 3.

Specifically, $R^7$ is an alkenyl group, preferably of 2 to 6 carbon atoms, such as vinyl, allyl or butenyl. $R^8$ is selected from monovalent organic groups, typically monovalent hydrocarbon groups, preferably of 1 to 20 carbon atoms, more preferably of 1 to 8 carbon atoms, for example, $C_1$-$C_{12}$ alkyl groups such as methyl, ethyl, propyl and butyl, $C_4$-$C_{20}$ cycloalkyl groups such as cyclohexyl, $C_6$-$C_{20}$ aryl groups such as phenyl and tolyl, and substituted forms of the foregoing in which some or all hydrogen atoms are replaced by halogen, cyano or the like, such as chloromethyl, trifluoropropyl, and cyanoethyl, as well as monovalent hydrocarbon groups containing $C_1$-$C_{12}$ alkoxy groups (e.g., methoxy, ethoxy, propoxy and methoxyethoxy), hydroxyl, or $C_2$-$C_{20}$ epoxy groups, such as glycidyl, glycidyloxy, or epoxycyclohexyl-substituted alkyl groups. $R^8$ is free of aliphatic unsaturation. From the industrial standpoint, $R^7$ is preferably vinyl. It is preferred for preparation and properties that methyl account for at least 80 mol % of $R^8$ in the overall organopolysiloxane as component (A).

While the organopolysiloxane as component (A) should contain at least two alkenyl groups per molecule, the content of alkenyl is desirably 0.001 to 0.3 mole per 100 g of the organopolysiloxane. In formula (8) and substituent group $X^1$, a3, b3, c3, d3, and e3 are selected such that the number of alkenyl groups per molecule: c3+b3×(e3+β)+2α may fall in the range of 2 to 2,500.

Although the main skeleton structure of the organopolysiloxane (A) is linear, an organopolysiloxane containing a branched chain structure as shown by the formula wherein b3 is not equal to 0 may also be employed.

Component B

Component (B) is a characteristic component for imparting adhesion to the composition. It functions like a coupling agent capable of coupling the substrate and a non-tacky cured coating of components (A) and (C), thereby improving adhesion. If only one type of reaction is utilized for reaction or interaction with the substrate and the non-tacky cured coating made of essentially different materials, the reaction tends to be biased to either one side whereby component (B) may not fully function as the coupling agent. Thus, according to the invention, radical reaction is assigned to the reaction or interaction with the substrate whereas addition or condensation reaction is assigned to the reaction or interaction with the non-tacky cured coating.

Component (B) must serve such that a single molecule may accommodate these two different reactions. One approach to this goal is to provide one molecule solely with substituent groups of the same type containing only a functional group capable of both the reactions. Although the reaction selectivity by the functional group is low, two reactions proceed, without biasing, depending on the characteristics of the molecular structure. The organosiloxane corresponding to this approach is component (B1).

Another approach is to provide one molecule with both a substituent group capable of radical reaction with the substrate rather than addition or condensation reaction, and another substituent group capable of addition or condensation reaction with the non-tacky cured coating of components (A) and (C) rather than radical reaction. The compound corresponding to this approach is component (B2).

Component (B) may be component (B1) or (B2) or a mixture of components (B1) and (B2). Components (B1) and (B2) may be mixed preferably in a weight ratio (B1):(B2) from 100:0 to 100:100, more preferably from 100:0 to 100:90, although the mixing ratio may be suitably adjusted in accordance with the desired level of adhesion, the type of substrate, and curing conditions. When a mixture of components (B1) and (B2) is used, the weight ratio (B1):(B2) preferably ranges from 100:5 to 100:100.

Since component (B1) does not require that a plurality of different functional groups be incorporated within one molecule as in component (B2), it is easy to prepare and advantageous in availability and cost. In addition, since component (B1) is a silicone compound similar to component (A) as the main component of the composition, it can be dissolved or dispersed in the composition in a stable manner, which is advantageous for the preparation and storage of the composition. These features, however, are detrimental to an access to the surface of a substrate of organic material, with the probability of reaction or interaction with the substrate taking place via radical reaction being reduced. For example, component (A), which possesses alkenyl groups capable of radical reaction, does not undergo reaction or interaction with the substrate that is effective for adhesion. The reason is that the low intermolecular force and inorganic nature of polysiloxane structure prohibit an access to the substrate surface, and most alkenyl groups are consumed by addition reaction with SiH groups in component (C) having an identical siloxane structure. Then component (B1) has an absolute viscosity of less than 0.04 Pa-s at 25° C. as measured by a rotational viscometer, a low molecular weight corresponding to a low degree of siloxane polymerization, a high alkenyl content of 0.3 to 2.0 mol/100 g, preferably 0.3 to 1.3 mol/100 g, more preferably at least 0.4 mol/100 g, wherein two siloxane units in which an alkenyl-containing substituent group is bonded to silicon atom are mutually juxtaposed in vicinity, whereby the surrounding organic nature is enhanced to facilitate an access of alkenyl group to the substrate, thereby facilitating reaction or interaction via radical reaction. It is noted that the lower limit of the absolute viscosity is usually 0.1 mPa-s, though not critical.

Component (B1) is an organopolysiloxane having a structure that two siloxane units in which an alkenyl-containing substituent group is bonded to silicon atom are linked directly or via up to 3 intervening siloxane units in which the alkenyl-containing substituent group is not bonded to silicon atom.

Specifically, the organopolysiloxane as component (B1) may be represented by the compositional formula (1) having a structure of the general formula (2).

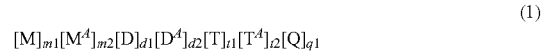

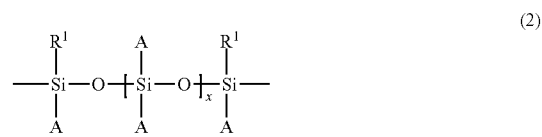

Herein $R^1$ is an alkenyl-containing substituent group of 2 to 10 carbon atoms, A is $R^2$ or a siloxane residue bonded via an oxygen atom and selected so as to meet formula (1), two A groups connected to one silicon atom may form a cyclic structure as —O(SiR$^2_2$O)$_y$—, $R^2$ is a substituted or unsubstituted monovalent hydrocarbon group of 1 to 10 carbon atoms, x is an integer of 0 to 3, y is an integer selected such that the organopolysiloxane of formula (1) may have an average degree of polymerization of 2 to 50.

M, $M^4$, D, $D^4$, T, $T^4$, and Q are siloxane units as defined below, $O_{1/2}$ denoting that adjacent siloxane units are linked via an oxygen atom.

M and $M^4$ each are:

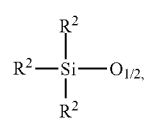

with the proviso that at least one $R^2$ in $M^4$ is $R^1$.

D and $D^A$ each are:

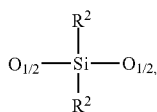

with the proviso that at least one $R^2$ in $D^A$ is $R^1$.
T and $T^A$ each are:

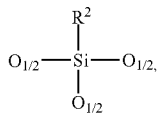

with the proviso that $R^2$ in $T^A$ is $R^1$.
Q is:

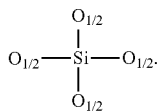

The subscripts m1, m2, d1, d2, t1, t2, and q1 are numbers satisfying the equations:

$$t1+t2+2\times q1 \leq m1+m2 \leq 2+t1+t2+2\times q1$$

$$0 \leq d1+d2 \leq 48, 0 \leq t1+t2 \leq 30, 0 \leq q1 \leq 20,$$

$$0.25 \leq (m2+d2+t2)/(m1+m2+d1+d2+t1+t2+q1) \leq 1.$$

Examples of the alkenyl-containing substituent group represented by $R^1$ include alkenyl groups such as vinyl and allyl, and (meth)acryloyloxy-substituted alkyl groups such as acryloyloxypropyl and methacryloyloxypropyl.

Suitable monovalent organic groups represented by $R^2$ include unsubstituted monovalent hydrocarbon groups, for example, straight, branched or cyclic alkyl groups such as methyl, ethyl, propyl and hexyl, aryl groups such as phenyl and tolyl, aralkyl groups such as benzyl, and alkenyl groups such as vinyl and allyl, and substituted forms of the foregoing monovalent hydrocarbon groups in which some or all hydrogen atoms are substituted by halogen atoms, and substituted forms of the alkyl groups in which a hydrogen atom is substituted by (meth)acryloyloxy, such as (meth)acryloyloxypropyl. Accordingly, $R^2$ may be $R^1$.

A is $R^2$ or a siloxane residue bonded via an oxygen atom and selected so as to meet formula (1), for example, methyl, ethyl, propyl, vinyl, allyl, (meth)acryloxypropyl, —O—Si(CH$_3$)$_2$(CH)═(CH$_2$), —O—Si(CH$_3$)$_3$, —O—Si(CH$_3$)$_2$(C$_6$H$_5$), methoxy, ethoxy, and propoxy groups. Two A groups connected to one silicon atom may form a cyclic structure as —O(SiR$^2_2$O)$_y$— wherein $R^2$ and y are as defined above. More specifically,

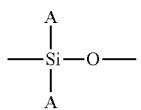

may be a group of

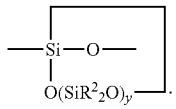

Component (B1) has an average degree of polymerization of 2 to 50, preferably 2 to 40, as measured by gel permeation chromatography (GPC) versus polystyrene standards. The subscript y is an integer selected such that the organopolysiloxane of formula (1) may have an average degree of polymerization within the range. Specifically, y is preferably an integer of 0 to 10, more preferably 1 to 8.

As seen from formula (2), the organosiloxane as component (B1) has a structure that two —SiR$^1$A- groups are linked via —O—(SiA$_2$O)$_x$— wherein x is 0 to 3, preferably 0 or 1. Namely, two —SiR$^1$A- groups having a silicon-bonded alkenyl group are juxtaposed in vicinity. When A is alkenyl, such groups are juxtaposed in close vicinity as a matter of course. Even when A is an alkyl group such as methyl or an aryl group such as phenyl, two —SiR$^1$A- groups are juxtaposed in vicinity. The subscript x representative of an extent of vicinity is at most 3, preferably 0 or 1, within which range the effect of the invention are achievable. If x is 4 or more, adhesion declines, failing to achieve the effect of improving adhesion without an impact on release performance.

Another effect expectable from the vicinal juxtaposition of alkenyl groups is that radical reaction proceeds predominantly while addition reaction is retarded. This effect becomes more significant when x is 0 or 1. The reason why the vicinal juxtaposition of alkenyl groups retards addition reaction is analogized from the fact that a compound of the identical structure can be utilized as an inhibitor. Once one alkenyl group is altered by radical reaction, the remaining alkenyl group becomes available for addition reaction, whereby reaction with the non-tacky cured coating takes place. In this way, the organosiloxane fully functions as the coupling agent.

If possible, the organosiloxane preferably contains at least three alkenyl groups, more preferably at least four alkenyl groups per molecule so that all alkenyl groups may not be consumed solely by the radical reaction. A low molecular weight is advantageous for the organosiloxane to function as the coupling agent because more bond sites are available over a wide area.

Examples of the organosiloxane having the structure of formula (1) include linear or branched organopolysiloxanes having the following formula (3) or (4).

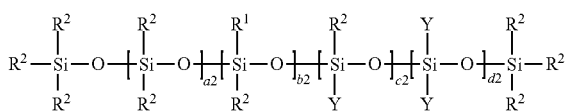

Herein $R^1$ and $R^2$ are as defined above, Y is a group of the following formula (3a):

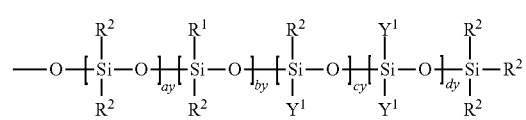

wherein $R^1$ and $R^2$ are as defined above. $Y^1$ is a group of the following formula (3b):

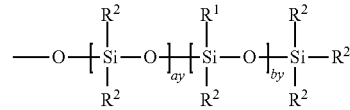

wherein $R^1$ and $R^2$ are as defined above.

The subscripts a2, b2, ay, and by each are an integer of 0 to 48, preferably 0 to 45, more preferably 0 to 40, c2 and cy each are an integer of 0 to 30, preferably 0 to 25, more preferably 0 to 20, d2 and dy each are an integer of 0 to 20, preferably 0 to 18, more preferably 0 to 15.

Formulae (3), (3a) and (3b) each denote a random structure and include at least one structure that two siloxane units in which the alkenyl-containing substituent group $R^1$ is bonded to silicon atom are linked directly or via up to 3 intervening siloxane units in which $R^1$ is not bonded to silicon atom.

(4)

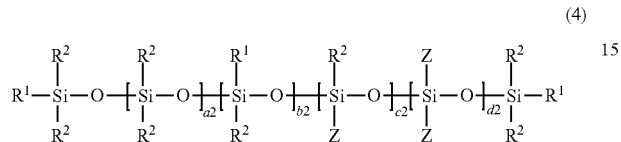

Herein $R^1$ and $R^2$ are as defined above, Z is a group of the following formula (4a):

(4a)

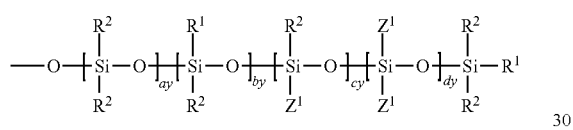

wherein $R^1$ and $R^2$ are as defined above. $Z^1$ is a group of the following formula (4b):

(4b)

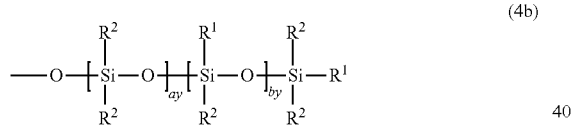

wherein $R^1$ and $R^2$ are as defined above.

The subscripts a2, b2, ay, and by each are an integer of 0 to 48, preferably 0 to 45, more preferably 0 to 40, c2 and cy each are an integer of 0 to 30, preferably 0 to 25, more preferably 0 to 20, d2 and dy each are an integer of 0 to 20, preferably 0 to 18, more preferably 0 to 15.

Formulae (4), (4a) and (4b) each denote a random structure and include at least one structure that two siloxane units in which the alkenyl-containing substituent group $R^1$ is bonded to silicon atom are linked directly or via up to 3 intervening siloxane units in which $R^1$ is not bonded to silicon atom.

Illustrative structures as component (B1) include linear organopolysiloxanes having the following formula:

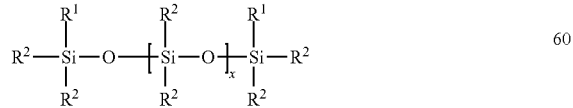

wherein x is as defined above. Also included are organopolysiloxanes of branched structure having a backbone of tri- or tetra-functional siloxane units, of the following formulae.

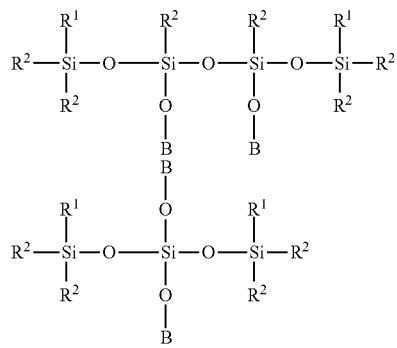

Examples of the siloxane residue A, Y, Z, and B are given below.

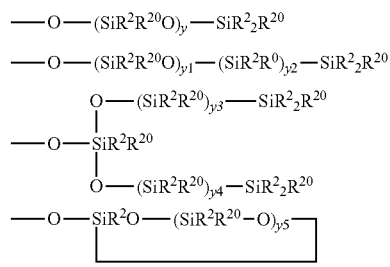

Herein $R^{20}$ is $R^2$ or $R^1$, $R^0$ is $-O-(SiR^2R^{20})_{y6}-SiR^2{}_2R^{20}$, y is as defined above, y1+y2+y6=y, y1 and y6 each are an integer of at least 0, y2 is an integer of at least 1, y3+y4=y, y3 and y4 each are an integer of at least 0, and y5=y.

More specific examples are given below.

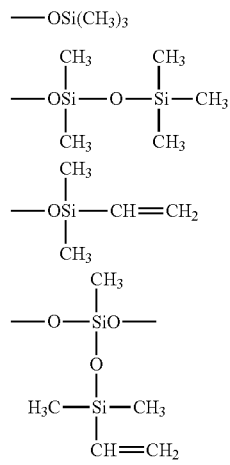

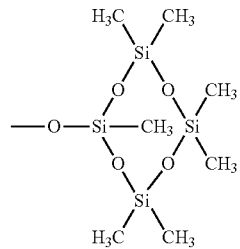

Component (B1) may also be an organopolysiloxane of cyclic structure having the general formula (5).

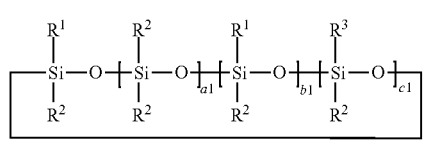

Herein $R^1$ and $R^2$ are as defined above, $R^3$ is a substituent group having an OH or SiH group as functionality or a substituted or unsubstituted monovalent hydrocarbon group of 1 to 10 carbon atoms free of aliphatic unsaturation, a1 is 0 or 1, b1 is an integer of 1 to 6, c1 is an integer of 0 to 5, and a1+b1+c1 is an integer of at least 2.

In formula (5), examples of the substituent group having an OH or SiH group as functionality, represented by $R^3$, include silicon-bonded hydroxyl, silicon-bonded hydrogen, $-CH_2CH_2CH_2-O-CH_2CH_2-OH$, and the like. Examples of the monovalent hydrocarbon group represented by $R^3$ include those exemplified above for $R^2$, with alkenyl groups being excluded.

Industrially desirable as component (B1) are those siloxanes of formula (5) wherein $R^1$ is vinyl, $R^2$ is methyl, $R^3$ is hydrogen, a1 is 0 to 1, b1 is 1 to 4, and c1 is 0 to 1, and more desirably a1=0, b1=2 to 4, and c1=0.

Component (B2) is a compound containing in a molecule at least one substituent group of 2 to 10 carbon atoms, preferably 2 to 8 carbon atoms, having a carbon-carbon unsaturated bond (double or triple bond) as functionality, and at least one substituent group having a group capable of addition reaction and/or condensation reaction with an alkenyl group and/or a silicon-bonded hydrogen atom (i.e., SiH group).

The compound as component (B2) possesses at least one substituent group having a carbon-carbon unsaturated bond as functionality, which indicates a substituent group having a functional group capable of radical reaction upon exposure to heat and/or UV. The structure of this substituent group may be either linear or branched, or even a cyclic structure such as cyclohexene or norbornadiene may be used. Any substituent group having a functional group as commonly used in radical polymerization or radical reaction curing systems may be used. Where component (B2) contains a siloxane structure, the substituent group should preferably be a substituent group having a carbon-carbon double bond such as methacryloyloxy or a carbon-carbon triple bond such as acetylene, propynyl or butynyl, especially for restraining consumption by addition reaction.

Where component (B2) is an organic compound free of siloxane structure, it makes an easy access to the substrate and is advantageous for reaction or interaction with the substrate via radical reaction, allowing a choice of the substituent group from a wider range. However, a non-silicone compound having a higher molecular weight is less compatible with silicone so that it may become difficult to acquire a bond or interaction with the non-tacky cured coating, or is little dissolvable in the composition and thus useless. Therefore, the organic compound should preferably have a number average molecular weight of up to 1,000 as measured by GPC versus polystyrene standards. In order for the organic compound to function as a coupling agent more efficiently for improving adhesion, a lower molecular weight is desirable since more bond sites are available over a wide area.

In component (B2), the substituent group having a functional group capable of radical reaction upon exposure to heat and/or UV functions such that component (B2) is anchored to the substrate surface where the composition is coated, through radical reaction and/or interaction with a group created by radical reaction. Creation of radicals may be attained by heat or irradiation of energy ray such as UV. Alternatively a radical generator such as peroxide or a photosensitizer may be added for the purpose of promoting radical creation insofar as the advantages of the invention are not impaired.

Since the substrate is made of organic material, there are present on the substrate numerous structures capable of generating radicals upon exposure to heat or UV or numerous structures capable of reacting with radicals thus generated.

In addition, the substrate has an extremely high rate of absorption of IR or UV radiation as the radical-generating energy source. Thus radicals can be concentratedly generated on the substrate, which is apt to promote reaction with the substrate.

In the case of heat-sensitive substrates such as plastic film, the radical creation technique based on UV irradiation is advantageous in that the temperature of the film substrate is not so elevated. Using UV radiation, the majority of which is absorbed by the film substrate surface, radicals can be concentratedly generated in proximity to the film substrate surface, which is desirable to promote reaction with the film substrate.

The compound as component (B2) also possesses at least one second substituent group. It is a substituent group having a functional group capable of reaction with the alkenyl group in component (A) and/or the SiH group in component (C). The reactions involved herein are addition reaction with SiH group for the alkenyl group in component (A), and condensation reaction with OH group and addition reaction with carbon-carbon double bond for the SiH group in component (C).

The second substituent group in component (B2) functions such that component (B2) is anchored to the non-tacky cured coating through addition and condensation reactions different from the radical reaction of the first substituent group. With this combined with the action of the substituent group for radical reaction, component (B2) functions as a coupling agent of anchoring the non-tacky cured coating and the substrate to each other, thereby improving adhesion.

Where component (B2) is an organic compound free of siloxane structure, it tends to be less compatible with the silicone component so that addition reaction may be retarded. If a substituent group having a carbon-carbon double bond as a functional group capable of reaction with the alkenyl group in component (A) and/or the SiH group in component (C) is selected, then it is consumed by radical reaction prior to addition reaction with the SiH group, with the risk of component (B2) failing to function as the coupling agent. To avoid such inconvenience, a SiH group or hydroxyl group unsusceptible to radical reaction is selected. For example, the compound may be a molecular structure containing a divalent structure having the general formula (6-1), or two divalent structures having the general formulae (6-2) and (6-3).

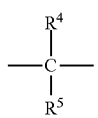

(6-1)

-continued

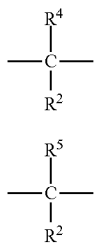
(6-2)
(6-3)

Herein $R^2$ is as defined above, $R^4$ is a substituent group of 2 to 10 carbon atoms, preferably 2 to 8 carbon atoms, containing alkynyl (e.g., acetylene, propynyl or butynyl), acryloyloxy or methacryloyloxy, and $R^5$ is a substituent group having an OH, SiH or alkenyl group as functionality. Of these structures, an industrially desirable example is HC≡C—C(CH$_3$)$_2$—OH.

Also included are cyclic structures having the general formulae (7-1) and (7-2).

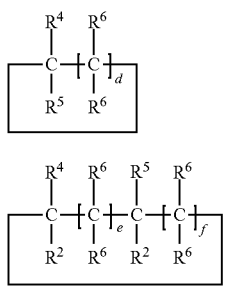
(7-1)
(7-2)

Herein $R^4$ and $R^5$ as defined above, $R^6$ is hydrogen, a saturated hydrocarbon group of 1 to 10 carbon atoms, preferably 1 to 8 carbon atoms, or aromatic group, the same group as $R^4$, or the same group as $R^5$, d is 4 to 10, and e+f is 3 to 9. Of these structures, an industrially desirable example is ethynyl cyclohexanol.

Both components (B1) and (B2) are commonly advantageous in that their molecular weight is low. However, a compound having a very low molecular weight has a risk that it will rapidly volatilize off the composition prior to any reaction when the composition is coated and heated on the substrate. It is thus desired that component (B) have such a molecular weight that its boiling point may be at least 80° C. For mitigating thermal impact, UV irradiation is effective because the temperature is not elevated.

An appropriate amount of component (B) blended is 0.1 to 10 parts by weight, preferably 0.2 to 9 parts by weight per 100 parts by weight of component (A). Outside the range, a less amount of component (B) achieves no improvement in adhesion whereas a larger amount may adversely affect cure.

Component C

Component (C) is an organohydrogenpolysiloxane containing at least three silicon-bonded hydrogen atoms (i.e., SiH groups) in a molecule. Preferably it has the average compositional formula (10):

$$R^8_f H_g SiO_{(4-f-g)/2} \tag{10}$$

wherein $R^8$ is as defined above, f is 0 to 3, g is 0 to 3, and f+g is a positive number of 1 to 3.

The molecular structure may be linear, branched or cyclic. The organohydrogenpolysiloxane has an absolute viscosity which may range from several mPa·s to several ten thousand mPa·s at 25° C. as measured by a rotational viscometer. Illustrative examples of the organohydrogenpolysiloxane are given below.

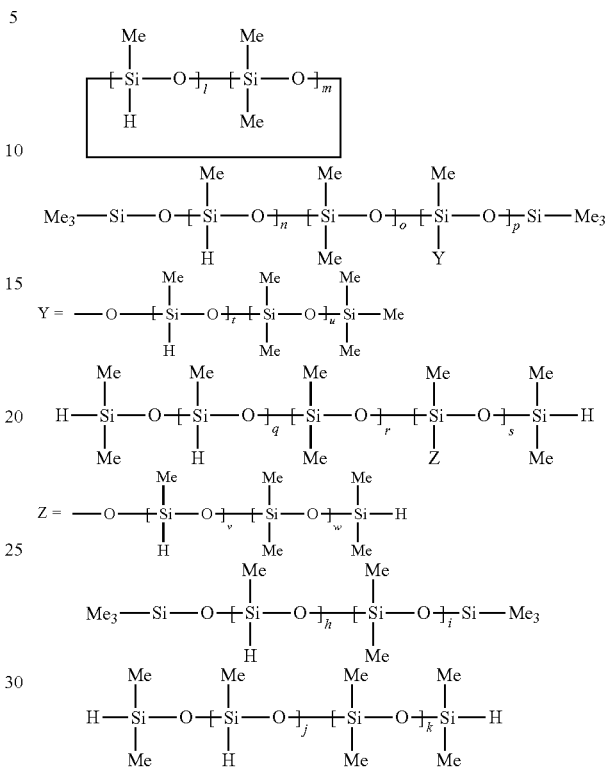

Herein, Me stands for methyl, h, l and n each are a number of 3 to 500, m, p and s each are a number of 1 to 500, j, k, o, q, r, t, u, v and w each are a number of 0 to 500.

The organohydrogenpolysiloxane as component (C) is blended in such amounts that the moles of SiH group is 1 to 10 times the total moles of alkenyl group in component (A). If the moles of SiH group in component (C) is less than the lower limit relative to the total moles of alkenyl group in component (A), the composition may not fully cure. If the moles of SiH group in component (C) is more than the upper limit, no further increase in the desired effect is observed and the peeling force may become heavy. Generally speaking, an appropriate amount of component (C) blended is 0.1 to 20 parts by weight per 100 parts by weight of component (A).

Component D

Component (D) is a platinum group metal base catalyst which may be selected from prior art well-known catalysts for addition reaction. Exemplary catalysts include platinum black, chloroplatinic acid, chloroplatinic acid-olefin complexes, chloroplatinic acid-alcohol coordination compounds, rhodium, and rhodium-olefin complexes. The catalyst may be added in a catalytic amount. Preferably the catalyst is added in such an amount as to provide 5 to 1,000 ppm of platinum or rhodium based on the total weight of components (A), (B) and (C), whereby a coating can be fully cured. The amount of the catalyst may be adjusted in accordance with the reactivity of the components or the desired cure rate.

Component E

Component (E) is an organic solvent which is added to the composition for the purposes of improving the stability of processing bath and applicability to various substrates and adjusting the coating weight and viscosity of the composition. Suitable organic solvents include toluene, xylene, ethyl acetate, acetone, methyl ethyl ketone, and hexane. Any other organic solvents may be used as long as the components can be uniformly dissolved therein.

When blended, the organic solvent is used in an amount of 100 to 9,900 parts by weight per 100 parts by weight of component (A).

Note that component (E) is optional. Absent component (E), the viscosity of components (A), (B), (C) and (D) is changed to adjust an overall viscosity such that the resulting composition may be effectively coated by an applicator. The stability of processing bath may be adjusted by adding a bath life extender or the like, if necessary.

The composition of the invention may be prepared simply by mixing components (A), (B), (C), (D) and (E) until uniform. To gain an appropriate pot life, component (D) should be added and mixed immediately before coating. When component (E) or organic solvent is used, one advantageous procedure is by dissolving components (A) and (B) in component (E) uniformly prior to mixing components (C) and (D) therewith.

If desired, additives including a pigment, leveling agent, and bath life extender may be added to the composition. Also a radical generator such as peroxide or a photosensitizer may be added for the purpose of promoting reaction insofar as the advantages of the invention are not impaired.

The composition is coated onto a substrate such as paper or plastic film directly or after diluting with a suitable organic solvent, by any well-known coating techniques, for example, using a bar coater, roll coater, reverse coater, gravure coater, air knife coater, or if thin-film coating is desired, a high-precision offset coater or multi-stage roll coater. Examples of the substrate include paper sheets such as glassine paper, polyethylene-laminated paper, kraft paper, clay-coated paper, and mirror-coated paper, and plastic films of polypropylene, polyethylene, polyethylene terephthalate (PET), polyvinyl chloride and the like.

The coating weight of the composition on the substrate varies with the type of the substrate material. The preferred coating weight is in a range of 0.05 to 5 g/m² as solids. The substrate coated with the composition is heated at 80 to 150° C. for 5 to 60 seconds to form a cured coating on the substrate surface, obtaining a release paper or film. The cure takes place by way of addition reaction between components (A), (B) and (C), and at the same time, heat-induced radical reaction enhances bond-formation and interaction between component (B) and the substrate. As a result, a silicone coating having good release properties, improved adhesion and film strength is formed on the paper or film substrate surface. When UV radiation is additionally applied, radical reaction in proximity to the paper or film substrate surface can be efficiently promoted without an excess elevation of temperature, facilitating preparation of release paper or film featuring high adhesion. For UV irradiation, any commercially available lamps or bulbs such as mercury lamps, metal halide lamps and fusion lamps may be used. Since the film substrate has a high absorption coefficient at 300 nm or shorter, those lamps or bulbs having a wavelength distribution containing more fractions of 300 nm or shorter wavelength are effective. An integral dose is 10 to 500 mJ/cm², which is obtained by irradiation, for example, from one or two 120-W lamps at a line speed of 10 to 100 m/min. Although heat and UV may be simultaneously applied, advantageously they are separately applied because a simple apparatus may be used. Depending on the structure of component (B) or the blending proportion of component (B) relative to other components, better results are obtained when heating is followed by UV irradiation, or when UV irradiation is followed by heating. Where component (B) contains a siloxane structure, the procedure of UV irradiation followed by heating is often effective. An effective procedure may be selected in accordance with a particular situation.

EXAMPLE

Examples of the invention are given below by way of illustration and not by way of limitation. All parts are by weight. Me stands for methyl, and Vi for vinyl. The viscosity is an absolute viscosity measured at 25° C. by a rotational viscometer.

Examples 1 to 11, 14, 15, Comparative Examples 1 to 8

A composition was prepared by mixing the amounts indicated in Table 1 of components (A), (B), (C) and (E) and an amount of component (D) so as to provide 100 ppm of platinum based on the total weight of (A)+(B)+(C). Using the composition, a release film was manufactured and evaluated according to the evaluation method described later. Specifically the curing step included UV irradiation from two 80-W lamps at a line speed of 40 m/min in an integral dose of 50 mJ/cm² and subsequent heating in a hot air circulating dryer for a predetermined time until a cured coating was formed.

Examples 12 and 13

A composition was prepared by mixing the amounts indicated in Table 1 of components (A), (B), (C) and (E) and an amount of component (D) so as to provide 100 ppm of platinum based on the total weight of (A)+(B)+(C). Using the composition, a release film was manufactured and evaluated according to the evaluation method described later. Specifically the curing step included heating in a hot air circulating dryer for a predetermined time and subsequent UV irradiation from two 120-W lamps at a line speed of 30 m/min in an integral dose of 100 mJ/cm² until a cured coating was formed.

The components in Table 1 are identified below.
—Component A
(A-1) organopolysiloxane, viscosity at 25° C. in 30 wt % toluene solution 10 Pa-s, Vi content 0.032 mol/100 g

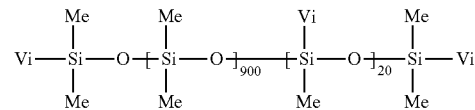

(A-2) organopolysiloxane, viscosity 0.2 Pa-s, Vi content 0.026 mol/100 g

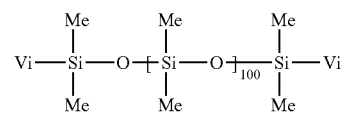

(A-3) organopolysiloxane, viscosity at 25° C. in 30 wt % toluene solution 5 Pa-s, Vi content 0.035 mol/100 g

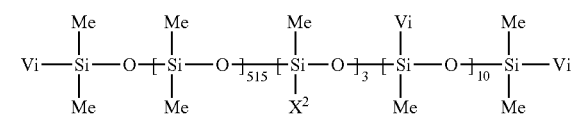

-continued $$X^2 = -O-\left[\underset{\underset{Me}{|}}{\overset{\overset{Me}{|}}{Si}}-O\right]_{130}-\left[\underset{\underset{Me}{|}}{\overset{\overset{Vi}{|}}{Si}}-O\right]_{3}-\underset{\underset{Me}{|}}{\overset{\overset{Me}{|}}{Si}}-Vi$$

(A-4) organopolysiloxane, viscosity 0.1 Pa-s, Vi content 0.043 mol/100 g $$Vi-\underset{\underset{Me}{|}}{\overset{\overset{Me}{|}}{Si}}-O-\left[\underset{\underset{Me}{|}}{\overset{\overset{Me}{|}}{Si}}-O\right]_{30}-\underset{|}{\overset{\overset{Me}{|}}{Si}}-O-\left[\underset{\underset{Me}{|}}{\overset{\overset{Me}{|}}{Si}}-O\right]_{30}-\underset{\underset{Me}{|}}{\overset{\overset{Me}{|}}{Si}}-Vi$$

with branch: $-O-\left[\underset{\underset{Me}{|}}{\overset{\overset{Me}{|}}{Si}}-O\right]_{30}-\underset{\underset{Me}{|}}{\overset{\overset{Me}{|}}{Si}}-Vi$ —Component B (B1-1) siloxane, viscosity 5 mPa-s, Vi content 1.2 mol/100 g $$\left[\underset{\underset{Me}{|}}{\overset{\overset{Vi}{|}}{Si}}-O\right]_{4}$$

(B1-2) siloxane, viscosity 5 mPa-s, Vi content 0.63 mol/100 g $$\left[\underset{\underset{Me}{|}}{\overset{\overset{Vi}{|}}{Si}}-O\right]_{2}-\left[\underset{\underset{Me}{|}}{\overset{\overset{Me}{|}}{Si}}-O\right]_{2}$$

(B1-3) siloxane, viscosity 10 mPa-s, Vi content 0.6 mol/100 g $$Me-\underset{\underset{Me}{|}}{\overset{\overset{Me}{|}}{Si}}-O-\left[\underset{\underset{Me}{|}}{\overset{\overset{Vi}{|}}{Si}}-O\right]_{5}-\left[\underset{\underset{Me}{|}}{\overset{\overset{Me}{|}}{Si}}-O\right]_{5}-\underset{\underset{Me}{|}}{\overset{\overset{Me}{|}}{Si}}-Me$$

(B1-4) siloxane, viscosity 6 mPa-s, Vi content 0.7 mol/100 g $$Me-\underset{\underset{Me}{|}}{\overset{\overset{Me}{|}}{Si}}-O-\left[\underset{\underset{Me}{|}}{\overset{\overset{Vi}{|}}{Si}}-O\right]_{3}-\underset{\underset{Me}{|}}{\overset{\overset{Me}{|}}{Si}}-Me$$

(B1-5) siloxane, viscosity 0.02 Pa-s, alkenyl content 0.33 mol/100 g $$Me-\underset{\underset{Me}{|}}{\overset{\overset{Me}{|}}{Si}}-O-\left[\underset{\underset{Me}{|}}{\overset{\overset{R^1}{|}}{Si}}-O\right]_{3}-\left[\underset{\underset{Me}{|}}{\overset{\overset{R^2}{|}}{Si}}-O\right]_{1}-\underset{\underset{Me}{|}}{\overset{\overset{Me}{|}}{Si}}-Me$$

$R^1$ is $-CH_2CH_2CH_2-O-CO-(CH_3)C=CH_2$ (127).
$R^2$ is $-CH_2CH_2CH_2-O-CH_2CH_2-OH$ (106).

(B1-6) siloxane, viscosity 6 mPa-s, alkenyl content 0.49 mol/100 g $$\left[\underset{\underset{Me}{|}}{\overset{\overset{R^1}{|}}{Si}}-O\right]_{3}-\left[\underset{\underset{Me}{|}}{\overset{\overset{H}{|}}{Si}}-O\right]_{1}$$

$R^1$ is $-CH_2CH_2CH_2-O-CO-(CH_3)C=CH_2$ (127).

(B1-7) siloxane, viscosity 5 mPa-s, Vi content 0.32 mol/100 g $$\left[\underset{\underset{Me}{|}}{\overset{\overset{Vi}{|}}{Si}}-O\right]_{1}-\left[\underset{\underset{Me}{|}}{\overset{\overset{Me}{|}}{Si}}-O\right]_{3}$$

(B1-8) siloxane, viscosity 6 mPa-s, Vi content 0.32 mol/100 g $$Vi-\underset{\underset{Me}{|}}{\overset{\overset{Me}{|}}{Si}}-O-\left[\underset{\underset{Me}{|}}{\overset{\overset{Me}{|}}{Si}}-O\right]_{6}-\underset{\underset{Me}{|}}{\overset{\overset{Me}{|}}{Si}}-Vi$$

(B1-9) siloxane, viscosity 0.05 Pa-s, Vi content 0.25 mol/100 g $$Me-\underset{\underset{Me}{|}}{\overset{\overset{Me}{|}}{Si}}-O-\left[\underset{\underset{Me}{|}}{\overset{\overset{Me}{|}}{Si}}-O\right]_{4}-\left[\underset{\underset{Me}{|}}{\overset{\overset{Vi}{|}}{Si}}-O\right]_{7}-\underset{\underset{Me}{|}}{\overset{\overset{Me}{|}}{Si}}-Me$$

(B1-10) siloxane, viscosity 0.01 Pa-s, Vi content 0.70 mol/100 g $$Vi-\underset{\underset{Me}{|}}{\overset{\overset{Me}{|}}{Si}}-O-\underset{\underset{Me}{|}}{\overset{\overset{Me-Si(Vi)Me}{|}}{Si}}-O-\left[\underset{\underset{Me}{|}}{\overset{\overset{O}{|}}{Si}}-O\right]_{6}-\underset{\underset{Me}{|}}{\overset{\overset{Me}{|}}{Si}}-Vi$$

(B2-1) acetylene alcohol, 3-methyl-1-butyn-3-ol
(B2-2) acetylene alcohol, 3,5-dimethyl-1-hexyn-3-ol
(B2-3) acetylene alcohol, 1-ethynyl-1-cyclohexanol
(B2-4) acetylene compound, 1-octyne —Component C (C-1) methylhydrogenpolysiloxane, viscosity 25 mPa-s, H content 1.5 mol/100 g $$Me-\underset{\underset{Me}{|}}{\overset{\overset{Me}{|}}{Si}}-O-\left[\underset{\underset{Me}{|}}{\overset{\overset{H}{|}}{Si}}-O\right]_{40}-\underset{\underset{Me}{|}}{\overset{\overset{Me}{|}}{Si}}-Me$$

(C-2) methylhydrogenpolysiloxane, viscosity 60 mPa-s, H content 1.00 mol/100 g

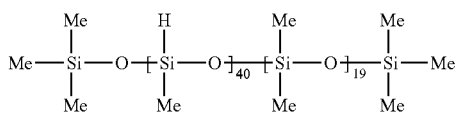

—Component D
(D-1) catalyst, platinum-vinylsiloxane complex
—Component E
(E-1) solvent, 50/50 (weight ratio) toluene/heptane mixture

TABLE 1

| | No. | | A | B1 | B2 | C | E | Cure (sec) | Peeling force (N) | Adhesion PET | OPP |
|---|---|---|---|---|---|---|---|---|---|---|---|
| Example | 1 | | A-1 100 | B1-1 2 | | C-1 4 | E-1 2,014 | 20 | 0.4 | ◎ | ◎ |
| | 2 | | A-1 100 | B1-2 4 | | C-1 6 | E-1 2,090 | 20 | 0.6 | ○ | ○ |
| | 3 | | A-1 100 | B1-3 4 | | C-1 6 | E-1 2,090 | 20 | 0.5 | ○ | ○ |
| | 4 | | A-3 100 | B1-4 4 | | C-2 9 | E-1 2,147 | 20 | 0.65 | ○ | ○ |
| | 5 | | A-3 100 | B1-5 4 | | C-2 8 | E-1 2,128 | 20 | 0.7 | ○ | ○ |
| | 6 | | A-3 100 | B1-6 2 | | C-2 7 | E-1 2,071 | 20 | 0.55 | ◎ | ◎ |
| | 7 | | A-1 100 | | B2-1 1 | C-1 4 | E-1 1,995 | 20 | 0.35 | ○ | ○ |
| | 8 | | A-3 100 | | B2-2 0.5 | C-1 4 | E-1 1,986 | 20 | 0.5 | ○ | ○ |
| | 9 | | A-2 100 | B1-1 2 | | C-1 4 | — | 20 | 0.5 | ◎ | ◎ |
| | 10 | | A-4 100 | B1-2 4 | | C-2 10 | — | 20 | 0.7 | ○ | ○ |
| | 11 | | A-2 100 | B1-1 2 | | C-1 4 | — | 20 | 0.5 | ○ | ○ |
| | 12 | | A-4 100 | B1-1 2 | B2-3 0.3 | C-2 10 | — | 20 | 0.6 | ◎ | ◎ |
| | 13 | | A-1 100 | B1-1 2 | | C-1 4 | E-1 2,014 | 20 | 0.4 | ○ | ○ |
| | 14 | | A-1 100 | B1-1 2 | | C-1 4 | E-1 2,014 | 20 | 0.4 | ○ | ○ |
| | 15 | | A-1 100 | B1-10 4 | | C-1 6 | E-1 2,014 | 20 | 0.8 | ○ | ○ |
| Comparative Example | 1 | | A-1 100 | B1-1 0.05 | | C-1 4 | E-1 1,977 | 20 | 0.4 | Δ | Δ |
| | 2 | | A-1 100 | B1-7 4 | | C-1 4 | E-1 2,052 | 20 | 0.35 | X | X |
| | 3 | | A-3 100 | B1-8 4 | | C-2 8 | E-1 2,128 | 20 | 0.5 | X | X |
| | 4 | | A-3 100 | B1-9 4 | | C-2 8 | E-1 2,128 | 20 | 0.5 | X | Δ |
| | 5 | | A-1 100 | | B2-4 0.5 | C-1 4 | E-1 1,986 | 20 | 0.35 | X | X |
| | 6 | | A-2 100 | B1-7 4 | | C-1 4 | — | 20 | 0.5 | X | X |
| | 7 | | A-4 100 | B1-8 4 | | C-2 8 | — | 20 | 0.6 | X | X |
| | 8 | | A-4 100 | | B2-4 0.5 | C-1 6 | — | 20 | 0.6 | X | X |

Evaluation Method

Evaluation of test items and expression of results are as follows.

(1) Cure

A solvent type composition was coated onto a PET film of 40 μm thick to a coating weight of 0.5 g/m² as solids by means of a bar coater. The coating was UV irradiated under two 80-W or 120-W UV lamps at a line speed of 30 m/min or 40 m/min to an integral dose of 50 mJ/cm² or 100 mJ/cm² and heat treated in a hot air circulating dryer at 80° C. for a predetermined time. A time passed until a completely cured coating was formed was measured. The coating being cured was examined by rubbing the coating surface with the finger and judged "completely cured" when the coating was not hazy on the surface or crumbled off.

A solventless composition was coated onto a PET film of 40 μm thick by means of an IR tester and dried in a hot air circulating dryer at 100° C. Otherwise, the coating was similarly treated and evaluated. The coating area was A4 size, and the transfer amount of coating liquid was 0.1 μL.

(2) Peeling Force

A solvent type composition was coated onto a PET film of 40 μm thick to a coating weight of 0.5 g/m² as solids by means of a bar coater. The coating was UV irradiated under two 80-W or 120-W UV lamps at a line speed of 30 m/min or 40 m/min to an integral dose of 50 mJ/cm² or 100 mJ/cm² and heat treated in a hot air circulating dryer at 100° C. for 30 seconds until a cured coating was formed, obtaining a test separator.

The separator was allowed to stand at 25° C. and 50% RH for one day, after which a solvent type acrylic pressure-sensitive adhesive (Oribain BPS-5127, Toyo Ink Mfg. Co., Ltd.) was coated onto the cured coating surface and heat treated at 100° C. for 3 minutes. Next, a PET film of 40 μm was laid on the treated surface, pressed by rolling once back and forth a roller of 2 kg, and aged at 25° C. for 20 hours. The sample was cut into a strip of 5 cm wide. Using a tensile tester, the force (N) required to peel the overlying PET film from the separator at an angle of 180° and a pull rate of 0.3 m/min was measured as adhesive strength. The tester used was autograph DCS-500 (Shimadzu Mfg. Co., Ltd.).

A solventless composition was coated onto a PET film of 40 μm thick by means of an IR tester. The coating was UV irradiated under two 80-W UV lamps at a line speed of 40 m/min to an integral dose of 50 mJ/cm² and heat treated in a hot air circulating dryer at 120° C. for 30 seconds until a cured coating was formed, obtaining a test separator. It was similarly evaluated. It is noted that the coating area was A4 size, and the transfer amount of coating liquid was 0.1 μL.

(3) Adhesion

A PET film (40 μm) substrate separator prepared as in (2) and another separator prepared as in (2) using a corona-treated OPP film (40 μm) as the substrate were aged under predetermined conditions. After a certain aging period (days), the separator was examined whether the coating surface became hazy and rubbed off when the surface of the cured coating was rubbed with the finger.

The sample which showed haze or rub-off after aging at 40° C. and 80% RH for one day was rated poor (x). The sample which showed haze or rub-off after aging at 40° C. and 80% RH for 3 days was rated fair (Δ). The sample which did not show haze or rub-off even after aging at 40° C. and 80% RH for one month was rated good (○). The sample which did not show haze or rub-off even after aging at 60° C. and 90% $R^H$ for one month was rated excellent (◉).

Japanese Patent Application No. 2010-107206 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition curing silicone composition for release paper or film, comprising
   (A) 100 parts by weight of organopolysiloxane containing at least two alkenyl groups in a molecule and having a viscosity of at least 0.04 Pa-s at 25° C.,
   (B) 0.1 to 10 parts by weight of an adhesion promoter compound having the following formula:

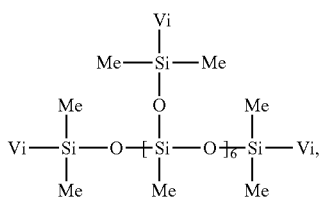

(C) 0.1 to 20 parts by weight of an organohydrogenpolysiloxane containing at least three silicon-bonded hydrogen atoms in a molecule,
   (D) a catalytic amount of a platinum group metal base catalyst, and
   (E) an amount of an optional organic solvent.

2. A method for preparing a release paper or film, comprising the steps of
   coating the silicone composition of claim 1 directly onto a paper or plastic film substrate, and
   applying heat and/or UV radiation to cure the coating.

3. The method of claim 2, wherein the step of applying heat and/or UV radiation comprises UV irradiation followed by heating to cure the coating.

4. A release paper or film comprising a cured coating of a silicone composition comprising
   (A) 100 parts by weight of an organopolysiloxane containing at least two alkenyl groups in a molecule and having a viscosity of at least 0.04 Pa-s at 25° C.,
   (B) 0.1 to 10 parts by weight of an adhesion promoter compound having the following formula:

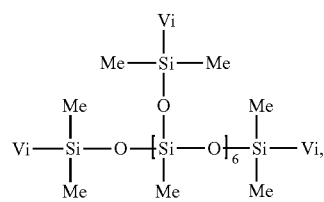

(C) 0.1 to 20 parts by weight of an organohydrogenpolysiloxane containing at least three silicon-bonded hydrogen atoms in a molecule,
   (D) a catalytic amount of a platinum group metal base catalyst, and
   (E) an amount of an optional organic solvent.

5. The silicone composition of claim 1, wherein component (A) is an organopolysiloxane of formula (8):

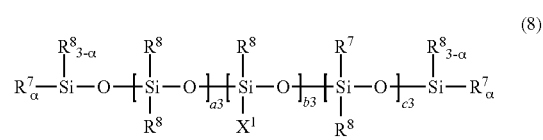

wherein
$R^7$ is alkenyl,
$R^8$ is a monovalent organic group free of aliphatic unsaturation or a hydroxyl group,
$X^1$ is a group of formula (9):

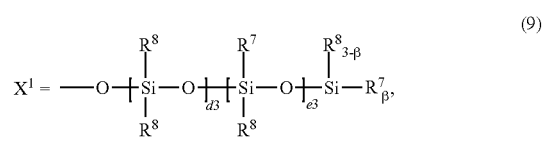

wherein b3, c3, d3, and e3 may be 0, provided that a3, b3, c3, d3, and e3 are such positive numbers that the organopolysiloxane has a viscosity of at least 0.04 Pa-s at 25° C. and a viscosity in 30 wt % toluene solution of up to 70 Pa-s at 25° C., and
α and β each are 0 or an integer of 1 to 3.

6. The silicone composition of claim 1, wherein component (C) has the average compositional formula (10):

$$R^8_f H_g SiO_{(4-f-g)/2} \qquad (10)$$

wherein $R^8$ is a monovalent organic group free of aliphatic unsaturation or a hydroxyl group, f is 0 to 3, g is more than 0 to 3, and f+g is a positive number of 1 to 3.

7. The silicone composition of claim 1, wherein component (D) is a member selected from the group consisting of platinum black, chloroplatinic acid, chloroplatinic acid-olefin complexes, chloroplatinic acid-alcohol coordination compounds, rhodium, and rhodium-olefin complexes.

8. The silicone composition of claim 1, which contains a solvent selected from the group consisting of toluene, xylene, ethyl acetate, acetone, methyl ethyl ketone, and hexane.

* * * * *